March 30, 1926.

G. E. KÖHLER

OPHTHALMIC MOUNTING

Filed April 1, 1925

INVENTOR.
Gustav E. Köhler
BY
ATTORNEY

March 30, 1926.　　　　　G. E. KÖHLER　　　　　1,578,528
OPHTHALMIC MOUNTING
Filed April 1, 1925　　　　2 Sheets-Sheet 2
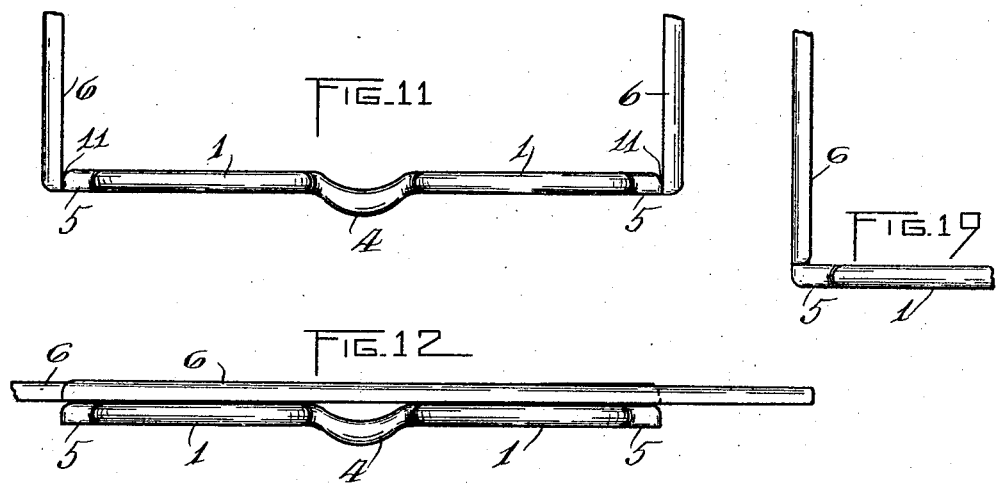
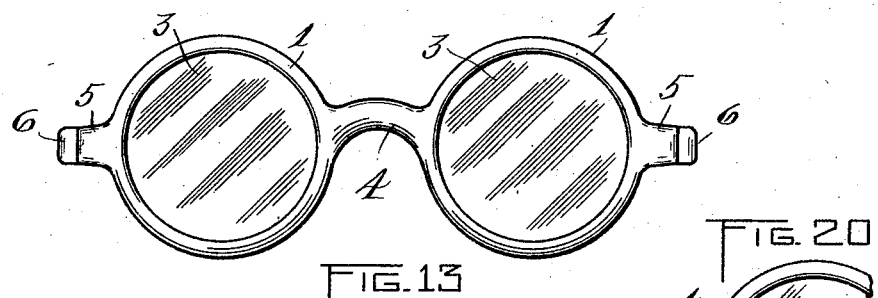
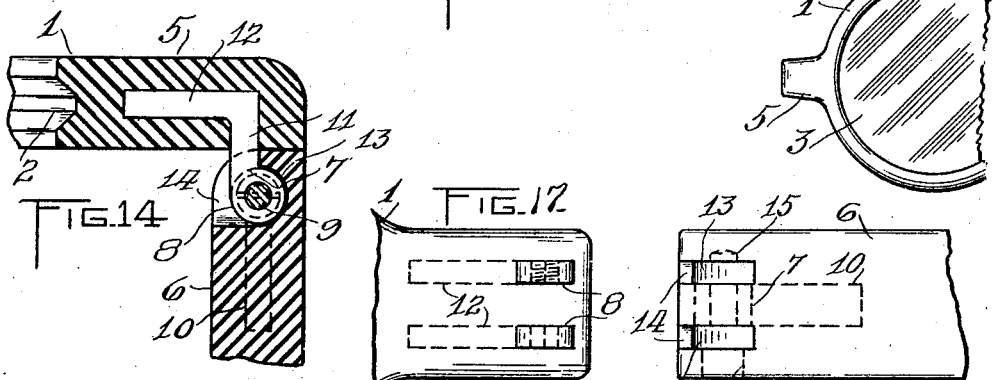
INVENTOR.
Gustav E. Köhler
BY
ATTORNEY Patented Mar. 30, 1926.

1,578,528

UNITED STATES PATENT OFFICE.

GUSTAV E. KÖHLER, OF ROCHESTER, NEW YORK.

OPHTHALMIC MOUNTING.

Application filed April 1, 1925. Serial No. 19,780.

*To all whom it may concern:*

Be it known that I, GUSTAV E. KÖHLER, a citizen of the United States, residing at Rochester, in the county of Monroe and State of New York, have invented a new and useful Improvement in Ophthalmic Mountings, of which the following is a specification.

The present invention relates to ophthalmic mountings formed of non-metallic material and more particularly to a novel hinge construction whereby the temples are joined to the lens frame, an object of the invention being to provide co-operating metallic hinge parts so embedded in the non-metallic material of the frame and temples as to be invisible from the front and sides of the mounting and practically so from any position in which the mounting may be viewed.

Another object of the invention is to accomplish the aforesaid object with the usual side lugs of the frame, to which the temples are connected, lying preferably in the plane of the frame.

A further object of the invention is to provide a hinge connection or temple joint of the character described in which, when the temples are opened they will abut the end faces of th said side lugs or be positioned behind such lugs with their ends abutting the inner faces of the lugs accordingly as the axes of the joints are located in the side lugs or the temples and, in either event, these axes are in the median plane of the members in which they are located.

A further object of the invention is to provide a temple joint of rigid construction, inexpensive to manufacture, neat in appearance, and which permits the temples when closed to lie flat against the frame.

And a still further object of the invention lies in the method of embedding and anchoring the metallic hinge parts in the non-metallic material of the frame and temples.

To these and other ends the invention consists of certain parts and combinations of parts as will be fully set forth in the following description and particularly defined in the appended claims.

The accompanying drawings illustrating the invention and forming a part of the specification are as follows.

Figure 1:
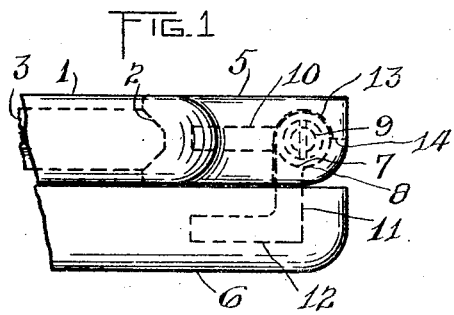
Figures 1 and 2 are enlarged fragmentary top views of a lens frame and temple hinged thereto the latter being shown, respectively, in closed and open position.
Figure 2:
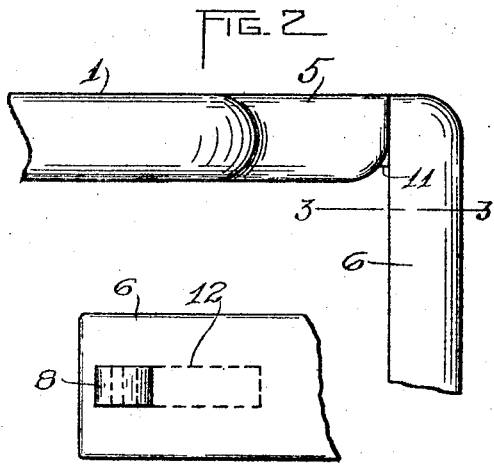
Figure 3:
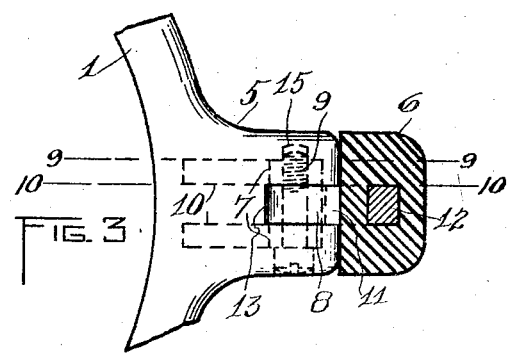
Fig. 3 is a view partly in elevation and partly in section on the line 3—3, Fig. 2.
Figure 4:
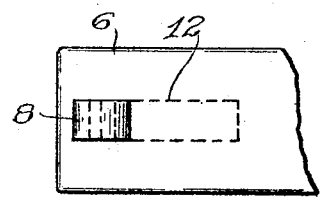
Fig. 4 is a fragmentary inner face view of a temple such as shown in Figs. 1, 2 and 3.
Figure 5:
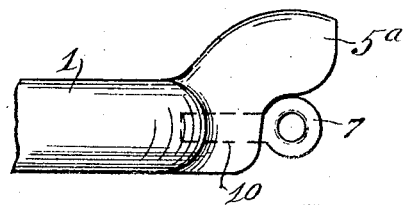
Figs. 5 and 6 are fragmentary top or edge views illustrating the method of anchoring the metallic hinge parts in the non-metallic material of the frame and temple, respectively.
Figure 10:
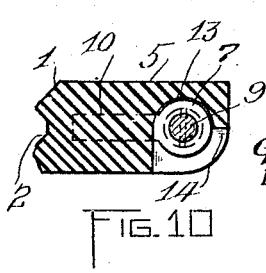

And, Fig. 10 is a sectional view of the frame on the line 10—10, Fig. 3.

In Figs. 1 to 10, inclusive, the axis of the hinge is located in the frame so that when the temple is swung to open position the inner face of its end will abut the end face of the frame lug.

Figs. 11, 12 and 13 are, respectively, top view of a mounting with temples opened, top view with temples closed and front view with temples opened, the temple joints being of the construction shown in Figs. 1 to 10, inclusive.

Fig. 14 is a fragmentary longitudinal sectional view through frame and temple of a modification of the invention in which the hinge members are reversed from the positions shown in Figs. 1 to 4 and with the axis located in the temple, the end face of the temple, in this instance, abutting the inner face of the frame side lug.

Figs. 15 and 16 are fragmentary inner face views of, respectively, the frame and the temple with one arrangement of the hinge parts in accordance with the modification shown in Fig. 14, and Figs. 17 and 18 are similar views of another arrangement of the hinge parts.

Figs. 19 and 20 are fragmentary views of a mounting similar to Figs. 11 and 13, but employing a temple joint of either modification shown in Figs. 14 to 18.

In the drawings similar reference numerals refer to similar parts throughout the several views.

The frame which is of non-metallic material comprises the rims 1 grooved as at 2 to receive the lenses 3, the bridge 4 and the usual outwardly projecting side lugs 5 to which the temples 6, also of non-metallic material, are hingedly connected.

Referring first to Figs. 1 to 6, inclusive, and 9 to 13:

The metallic hinge for each temple joint comprises two circular bearing members 7 formed of flat stock and spaced apart to receive between them a similar but preferably thicker member 8, the three members being drilled to receive a pivot screw 9 while the hole in one of the members 7 is tapped for threaded engagement with the screw 9. Each of these hinge members 7 is formed with a centrally disposed extension 10, and the member 8 is formed off center with an arm 11 having a lateral extension 12.

The bearing members 7 are, in this instance, carried by a side lug 5 of the frame and embedded therein. To this end the frame is heated to a degree sufficient to make the material pliable and when in this condition the lug is pressed outwardly from the plane of the frame substantially as shown at 5ᵃ in Fig. 5. Holes are then drilled longitudinally of the frame, preferably in the median line of the frame, and into which the extensions 10 of the members 7 are pressed. By means of suitable dies the lug is pressed back from the position shown at 5ᵃ so as to align with the frame, and during which operation the non-metallic material of the lug is formed over and around the bearing members 7, embedding such members in the non-metallic material. During this same operation a pocket 13 is formed between the members 7 for receiving the co-operating bearing member 8, clearance being provided to permit free rotary movement of such member, this pocket opening into an arcial slot 14 in the rounded corner of the rear and end faces of the lug 5 to permit angular movement of the arm 11 formed on the member 8.

Figure 6:
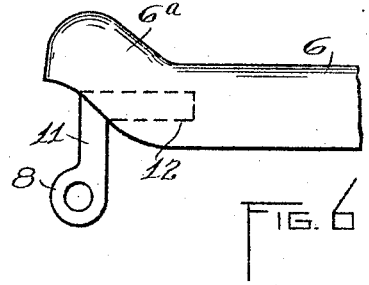

Likewise, the temple 6 is heated and the front end pressed outwardly as at 6ᵃ, Fig. 6, to permit drilling a hole into which the extension 12 is pressed, after which by suitable dies the temple is straightened out with the extension 12 and a part of the arm portion 11 embedded herein.

Thereafter the lug 5 is drilled at 15 for receiving the pivot screw 9 and countersunk at 16 for the head of the screw, the screw preferably being inserted from the underside of the lug 5 so as to be invisible, the drill hole stopping short of the top of the lug.

Figure 7:
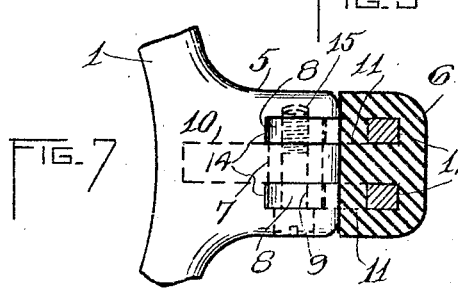
Figs. 7 and 8 are views similar to Figs. 3 and 4 but showing a modification of the arrangement of the hinge parts as will be explained.
Figure 8:
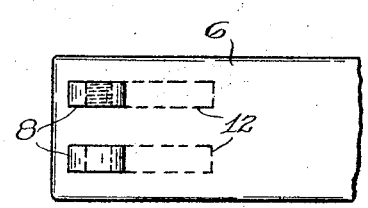
Figure 9:
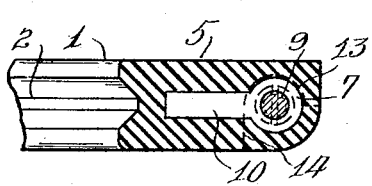
Fig. 9 is a sectional view of the frame on the line 9—9, Fig. 3.

In Figs. 7 and 8 the hinge construction is similar to that just above described except that two members 8 are carried by the temple 6 and arranged to straddle a single bearing member 7 centrally located in the side lug 5, and in this instance two pockets 13 are formed in the lug for receiving the bearing members 8.

In Figs. 14, 15 and 16 the hinge construction is the same as described with reference to Figs. 1 to 6, inclusive, but with the parts reversed, that is,—the bearing members 7 are embedded in the temple 6 and a pocket 13 formed between them for receiving the member 8 which, in this instance, is carried by the frame lug 5 and projects rearwardly therefrom. With this modification the axis of the hinge is in the median line of the temple, and the end face of the temple abuts the rear face of the frame lug 5, the inner end edge of the temple being rounded while in the first described modification the inner end edge of the lug is rounded, this rounding of one part or the other, according to the hinge arrangement used, permitting the temple to be opened and closed and to bear against the frame for all angular positions of the temple.

Figs. 17 and 18 show an arrangement of the hinge parts similar to that shown in Figs. 7 and 8 but of the modification shown in Figs. 14, 15 and 16.

From the foregoing it will be seen that I have provided a temple joint for ophthalmic mountings of non-metallic material in which metal hinge parts are embedded in such material so as to be practically invisible from any position in which the mounting may be viewed; the side lugs of the frame lie in the plane thereof and are not distorted by being curved rearwardly or made unnecessarily large; the axis of each hinge may be in either a side frame lug or a temple, in one instance the temple when open bearing against the end face of the lug and, in the other instance, the end face of the temple bearing against the inner face of the lug; the hinge construction is strong and durable with the metal parts not exposed to corrosion; and the frame lug or the temple, in whichever the axis is located, is formed intermediate its top and bottom faces and in rear of its front face, with a pocket for receiving the hinge bearing member carried by the other part.

What I claim is:

1. In an ophthalmic mounting, a lens enclosing rim and a lug on the rim of non-metallic material, and a metallic hinge member embedded in said lug between the surfaces thereof, one face of said hinge member being exposed to a pocket formed in the lug and the opposite face being covered by the material of the lug, the inner and outer end faces of the lug being rounded at their juncture and cut away to form an arcial slot opening into said pocket.

2. In an ophthalmic mounting, a lens enclosing rim, a side lug on the rim and in the plane thereof, both of non-metallic material, and a metal hinge member embedded in said lug between the surfaces thereof, one face of said hinge member being exposed to a pocket formed in the lug and the opposite face being covered by the material of the lug, the inner and outer end faces of the lug being rounded at their juncture and cut away to form an arcial slot opening into said pocket.

3. In an ophthalmic mounting, two parts, viz, a frame lug and a temple, both of non-metallic material, a metallic hinge member embedded in one of said parts between the surfaces thereof, a metallic hinge member formed with a bearing part projecting entirely from the inner face of the other of said parts, and a pivot engaging through the two hinge members, the part in which the first named hinge member is embedded being formed with a pocket for receiving said projecting hinge member, a wall of said pocket being slotted to permit functioning of the hinge, said first named hinge member being entirely embedded in the non-metallic material except for the one face which is exposed to said pocket.

4. In an ophthalmic mounting, a frame, side lugs on the frame and temples, all of non-metallic material, metallic hinge bearing members flexibly connecting the temples to the side lugs, and pivots on which said members are mounted, said pivots and their respective hinge bearing members being entirely embedded between the surfaces of said side lugs, said lugs being formed with arcial slots at the juncture of their inner and outer end faces to permit relative rotary movement of the hinge members.

5. In an ophthalmic mounting, two parts, viz, a frame lug and a temple both of non-metallic material, a metallic hinge joint whereby the two parts are pivotally connected, the axis of the hinge being intermediate the side faces of one of said parts, and the hinge bearing members being entirely embedded in the part in which the axis is located, such part being slotted at the juncture of its inner and outer end faces to permit relative rotary movement of the hinge members.

6. In an ophthalmic mounting, two non-metallic parts, viz, a frame lug and a temple, and a metallic hinge joint having its axis in the plane of one of said parts, such joint comprising a pivot member and three bearing members mounted on the pivot, two of such members being spaced apart and embedded in one of said parts between the surfaces thereof, anchoring means comprising extensions formed on said embedded members and also embedded in such non-metallic part, such part being formed between the two embedded members with a pocket for receiving the third bearing member, the latter projecting from the inner face of the other non-metallic part, an arm on said latter member operating in a slot in a wall of said pocket, and an extension on said arm comprising anchoring means for said third bearing member in its respective non-metallic part, such extension lying in the direction of the non-metallic part and starting from a point in rear of the adjacent end face of the part, said spaced bearing members having their outer faces covered by the non-metallic material and their opposing inner faces exposed to said pocket.

7. In an ophthalmic mounting, two parts, viz, a frame and a temple both of non-metallic material, a metallic hinge joint whereby the two parts are pivotally connected, the axis of the hinge being intermediate the side faces of one of said parts and in rear of the end face a distance greater than half the diameter of the hinge, the adjacent end faces of the two parts being aligned when the temple is closed, and the end face of the axis carrying part abutting the inner face of the other part when the temple is open with the end face of the last named part aligned with the outer face of the axis carrying part.

8. In an ophthalmic mounting, a frame side lug and a temple, both of non-metallic material, a metallic hinge joint whereby the two parts are pivotally connected, the axis of the hinge being intermediate the side faces of the frame lug and in rear of the end face a distance greater than half the diameter of the hinge, the adjacent end faces of the temple and lug being aligned when the temple is closed, and the end face of the lug abutting the inner face of the temple when the latter is opened with the end face of the temple aligned with the outer face of the frame lug.

GUSTAV E. KÖHLER.